United States Patent

Mochizuki et al.

[11] Patent Number: 6,083,476
[45] Date of Patent: Jul. 4, 2000

[54] BLACK ULTRAFINE MAGNETITE PARTICLES AND PROCESS FOR PREPARING THE SAME

[75] Inventors: Naoyoshi Mochizuki; Kenzo Hanawa, both of Ageo, Japan

[73] Assignee: Mitsui Mining & Smelting Company, Ltd., Japan

[21] Appl. No.: 08/981,332

[22] PCT Filed: May 7, 1997

[86] PCT No.: PCT/JP97/01524

§ 371 Date: Jan. 29, 1998

§ 102(e) Date: Jan. 29, 1998

[87] PCT Pub. No.: WO97/42125

PCT Pub. Date: Nov. 13, 1997

[30] Foreign Application Priority Data

May 8, 1996 [JP] Japan .................................. 8-113397

[51] Int. Cl.[7] .............................. C09C 1/22; C01G 49/08; C01G 49/02; B32B 5/16
[52] U.S. Cl. ......................... 423/632; 106/456; 106/460; 252/62.56; 423/632; 428/403; 428/404; 428/405; 428/406; 428/407; 430/106.6
[58] Field of Search .............................. 423/632; 106/456, 106/460; 252/62.56; 430/106.6; 428/403, 404, 405, 406, 407

[56] References Cited

U.S. PATENT DOCUMENTS

| | | | |
|---|---|---|---|
| 4,491,619 | 1/1985 | Biermann et al. | 428/403 |
| 4,551,260 | 11/1985 | Hayakawa et al. | 252/62.59 |
| 4,753,679 | 6/1988 | Damiano et al. | 106/95 |
| 4,952,617 | 8/1990 | Ayala et al. | 523/200 |
| 5,368,933 | 11/1994 | Aoki et al. | 428/329 |
| 5,401,313 | 3/1995 | Supplee et al. | 106/712 |
| 5,486,233 | 1/1996 | Mitchell et al. | 106/416 |
| 5,558,967 | 9/1996 | Nagatsuka et al. | 430/106.6 |

FOREIGN PATENT DOCUMENTS

| | | |
|---|---|---|
| 009718 | 3/1976 | Japan . |
| 033655 | 7/1990 | Japan . |

OTHER PUBLICATIONS

Kim et al. Preparation and Characteristics of Magnetite Ferrofluid. Journal of the Korean Ceramic Society. vol. 27, No. 1, pp. 13–22, 1990.

Jung et al. Adsorption, Precipitation, and Electronkinetic Processes in the Iron Oxide (Goethite)–Oleic Acid–Oleate System. Journal of Colloidal and Interface Science, vol. 118, No. 2, 1987.

*Primary Examiner*—Gary P. Straub
*Assistant Examiner*—Cam N. Nguyen
*Attorney, Agent, or Firm*—Bierman, Muserlian and Lucas

[57] ABSTRACT

Black ultrafine magnetite particles of this invention have an FeO content of 31 to 35% and a particle size of 0.1 μm or less. A process for producing the black ultrafine magnetite particles comprises dispersing ultrafine magnetite particles with a particle size of 0.1 μm or less in water containing ferrous hydroxide, aging the dispersion of 90 to 200° C. at a free alkali concentration of 1 mol/liter (M/l) or more, then adding 0.2 to 5%, based on the magnetite particles, of sodium oleate or potassium oleate, and adjusting the pH to 5 to 6 to adhere oleic acid to magnetite.

2 Claims, No Drawings

BLACK ULTRAFINE MAGNETITE PARTICLES AND PROCESS FOR PREPARING THE SAME

TECHNICAL FIELD

This invention relates to black ultrafine magnetite particles mainly for use as the starting powder for an electrostatic copying magnetic toner, and a black pigment powder for paints, and a process for the production of the magnetite particles.

BACKGROUND ART

In recent years, the spread of electrostatic copiers or laser beam printers employing electrophotographic technologies has been remarkable. In harmony with this trend, the properties of printing graphics or photographs with high reproducibility have been desired. With the concurrent progress of techniques for the meticulous creation of latent images, there has been a demand for the accurate printing of thin lines by development. To fulfill these requirements, the particle sizes of magnetic toners have been made smaller. Magnetite added as a magnetic black pigment should also be formed into fine particles.

Magnetite in current use has a particle size of 0.1 to 0.3 $\mu$m. Thus, the need for ultrafine magnetite with a particle size of 0.1 $\mu$m or less is growing. However, 0.1 $\mu$m or less ultrafine magnetite particles with a black tint sufficient for use as a black pigment is nonexistent as yet.

Fine magnetite particles for use as a magnetic black pigment to be incorporated into a magnetic toner are generally those obtained by adding an alkali to ferrous sulfate to obtain a suspension of $Fe(OH)_2$, and air oxidizing the suspension at a suitable temperature. Various attempts to obtain fine particles 0.1 $\mu$m or less in diameter by this method have been made based on studies of conditions, such as pH, rate of oxidation and reaction temperature. However, it is difficult to make the particle size smaller than 0.1 $\mu$m while retaining a black color.

It is well known to add an alkali to a mixed aqueous solution of a ferrous salt and a ferric salt to cause coprecipitation, and age the coprecipitates at 50 to 100° C., thereby forming ultrafine magnetite with a particle size of 0.01 $\mu$m or less.

The so obtained ultrafine particles are so fine that when they are taken out into the air, they are oxidized, making their use for a magnetic toner or the like difficult. Their use is restricted to applications excluded from the air, such as magnetic fluid.

As a method for overcoming the drawbacks of the foregoing two representative methods, Japanese Patent Publication No. 33655/90 discloses a process for producing ultrafine magnetite with a particle size of about 0.01 to 0.025 $\mu$m.

The technique disclosed there makes the content of a ferrous salt higher than in the composition of magnetite when obtaining ultrafine magnetite by coprecipitation, to cause ferrous hydroxide to remain after coprecipitation, and air oxidizes the ferrous hydroxide to grow air oxidation-induced magnetite on the coprecipitated ultrafine magnetite particles, thereby somewhat enlarging the ultrafine magnetite particles for stabilization.

Even this method, however, poses the problem that when the particles are taken out into the air, they become reddish and cannot serve as a magnetic black pigment.

The present situation is, therefore, that there is no ultrafine magnetite 0.1 $\mu$m or less in particle size which is black enough to be used as a magentic black pigment.

The object of the present invention is to provide black ultrafine magnetite particles for a black magnetic toner that earlier technologies were unable to produce, and a process for producing the black ultrafine magnetite particles.

DISCLOSURE OF THE INVENTION

The chemical composition of magnetite is expressed as $FeO.Fe_2O_3$, and originally its FeO content is 31%. As its specific surface area increases, magnetite becomes more oxidizable. Actually, when magnetite is withdrawn into the air, its FeO content is difficult to maintain at 31%.

Fine magnetite particles in current use as a black magnetic pigment have a particle size of 0.1 to 0.3 $\mu$m and a BET specific surface area to 2 to 10 $m^2/g$. Its FeO content is about 20 to 26% rather than 31%.

Increasing FeO content gives a reddish color. Thus, the FeO content should be managed when magnetite is to be used as a black pigment.

Magnetite with a conventional particle size is black enough to be usable as a black pigment, if its FeO content is kept at about 25%. As the particle size is decreased, however, it has been found that reddishness increases even at the same FeO content.

Under these circumstances, we have studied how much FeO content gives magnetite particles sufficient blackness. This study found that ultrafine particles with a particle size of 0.1 $\mu$m or less are sufficiently black if their FeO content is 31% or more. This finding led us to accomplish the present invention.

Black ultrafine magnetite particles based on that finding are characterized by having an FeO content of 31 to 35% and a particle size of 0.1 $\mu$m or less.

As the particle size decreases, moreover, the specific surface area increases, resulting in an increased tendency toward oxidation. Thus, the FeO content tends to become lower as the particles become finer.

However, the absorption of light with a wavelength close to 400 nm somewhat declines as FeO decreases. When the particle size is large, the particles are polycrystals, and thus light with such a wavelength is absorbed upon repeated refraction. As a result, the particles can become black. As the particle size decreases, on the other hand, refraction inside the particles cannot be expected. Thus, the absorption characteristics of the particles per se directly count. This means that the finer the particles become, the higher the FeO content needs to be made; otherwise, the particles will not become black.

Furthermore, the blackness of fine particles as viewed in their powdery form is different from the blackness of the fine particles when dispersed in resin. Fine particles viewed in powdery state look black when they are agglomerated.

Fine particles were dispersed in resin to ascertain their blackness. It was confirmed that unless an FeO content of 31% or more was present, the blackness of ultrafine particles with a particle size of 0.1 $\mu$m or less could not be retained.

The chemical formula of magnetite has hitherto been expressed as $FeO.Fe_2O_3$, in which case the FeO content is 31%. In fact, however, the FeO content is usually less than 31%. There have been no reports of magnetite containing a larger amount of FeO than in the stoichiometric composition, and such magnetite has been said to be unobtainable.

Whatever method is adopted, particles with a particle size of 0.1 $\mu$m or less prepared by the method has an FeO content of 10 to 20%. A method for controlling the FeO content is described in Japanese Patent Publication No. 9718/76. That is, fine magnetite particles are dispersed in water containing ferrous hydroxide, an alkali is added to make the pH of the dispersion 8.0 to 14, and the mixture is aged in a non-oxidizing atmosphere at 50 to 100° C.

This patent, however, shows $FeOx.Fe_2O_3$ where $0<x<1$. Since the FeO content is 31% when x=1, the patent describes FeO as existing only in an amount of less than 31%.

Hence, fine magnetite particles with an FeO content of 31% or more can be regarded as a brand-new substance in comparison with conventional fine magnetite particles.

We have done various studies and found that when fine magnetite particles are aged at a temperature in the range of from 90 to 100° C. in a ferrous hydroxide slurry having a pH of 14 or more, i.e., containing 1 mol/liter (M/l) or more of a free alkali, the FeO content can be increased to 31% or more. It has also been found that the upper limit of the increased FeO content is 35%, and a higher FeO content than this limit is impossible to achieve. The atmosphere at this time need not be non-oxidizing. The amount of the ferrous hydroxide added all penetrates the magnetite up to an FeO content of 35%, but an amount more than the amount corresponding to this content remains as ferrous hydroxide.

If it remains as ferrous hydroxide, washing and filtration become markedly difficult. After drying, ferrous hydroxide is very oxidizable. Even when undergoing an anti-oxidizing treatment, ferrous hydroxide after drying usually flares up when taken out into the air. Therefore, the amount of ferrous hydroxide added must be strictly managed, and the FeO content must finally come into the range of 31 to 35%.

Even when the FeO increasing treatment is performed to increase the FeO content to 31% or more, FeO is oxidized when the suspension is washed, filtered, and dried. Thus, it is difficult to maintain the FeO content at 31% or more in the dry powdery state. Even if washing, filtration and drying are carried out in a completely non-oxidizing atmosphere, oxygen in the water molecules is taken away to proceed with oxidation. Thus, oxidation cannot be prevented completely.

Under this situation, an anti-oxidizing treatment was investigated to avoid oxidation of FeO during washing, filtration and drying. Among known methods for anti-oxidizing treatment are the method of adhereing a fatty acid, such as stearic acid or oleic acid, to the surface to protect the inside, and the method of adhereing a stable oxide, such as silicon oxide or aluminum oxide, to the surface to protect the inside.

Of these substances, oleic acid was found by various studies to be the only substance that could maintain the FeO content of ultrafine magnetite particles with a particle size of 0.1 µm or less at 31% or more.

After the FeO increasing treatment, sodium oleate is added to the suspension, and the pH is adjusted to 5 to 6, whereby oleic acid can be adhered to the surface of magnetite. Then, the system is washed, filtered and dried. Alternatively, following the FeO increasing treatment, sodium sulfate formed as a by-product is washed off, whereafter sodium oleate may be added, although sodium oleate dissolves highly only at a pH of 8 or more. The preferred amount of sodium oleate added is 0.2 to 5% based on magnetite particles.

If the amount of sodium oleate added is less than 0.2%, a sufficient anti-oxidizing effect is not obtained. If the amount of sodium oleate added exceeds 5%, fine magnetite particles agglomerate considerably. When formed into a toner, these agglomerated particles cannot mix with resin.

As the oleate, a potassium salt of oleic acid will do besides a sodium salt of oleic acid.

A process for producing black ultrafine magnetite particles based on the above-mentioned findings comprises dispersing ultrafine magnetite particles with a particle size of 0.1 µm or less in water containing ferrous hydroxide, aging the dispersion at 90 to 100° C. at a free alkali concentration of 1 mol/liter (M/l) or more, then adding 0.2 to 5%, based on the magnetite particles, of sodium oleate or potassium oleate, and adjusting the pH to 5 to 6 to adhere oleic acid to magnetite.

BEST MODE FOR CARRYING OUT THE INVENTION

Embodiments of the present invention will now be described in detail, but the invention is not restricted thereto.

EMBODIMENT 1

1 Liter of a 0.5M/l ferrous hydroxide slurry and 2 liters of a 0.5M/l ferric hydroxide slurry were mixed at room temperature. The mixture was heated to 100° C. quickly, and boiled for 1.5 hours. The resulting black slurry was washed with water, filtered and dried to obtain 110 g of black fine particles (particle size 0.02 to 0.03 µm). X-ray diffraction confirmed the black fine particles to be magnetite.

The saturation magnetization of the fine magnetite particles was 83 emu/g, and their BET specific surface area was 43 $m^2/g$. Analysis showed the FeO content to be 17%.

50 Grams of the fine magnetite particles were kneaded with 50 g of low molecular weight polyethylene wax in a biaxial kneader for 1 hour at 150° C. The mixture was taken out, and crushed to a particle size of 1 mm or less in an iron mortar. The crushed product was further ground by a jet mill to an average particle size of 10 µm, and this resin mixture with a particle size corresponding to that of a toner was examined for color.

The fine magnetite particles were black, but when mixed with the resin, they were strongly reddish.

50 Grams of the above black fine particles (particle size 0.02 to 0.03 µm) were suspended in 0.5 liter of distilled water, and 0.5 liter of a slurry containing 0.112M ferrous hydroxide was added. To this system, a solution of 2M sodium hydroxide in 0.1 liter of water was further added.

The mixture was heated to 100° C., and held for 2 hours. After the mixture was cooled to 60° C., 1%, based on magnetite, of sodium oleate was added. Then, 1N sulfuric acid was gradually added to adjust the pH to 5.5 and adhere oleic acid to the particles. After washing, filtration and drying, the black fine particles were taken out.

X-ray diffraction confirmed the black fine particles to be magnetite.

The saturation magnetization of the fine magnetite particles was 84 emu/g, and their BET specific surface area was 25 $m^2/g$. Analysis showed the FeO content to be 32%.

These particles were mixed with resin in the same manner as described above, and the mixture was examined for color. This resin mixture was as black as the fine particles.

EMBODIMENTS 2 TO 8

Black fine particles (particle size 0.02 to 0.03 µm) were obtained in the same manner as in Embodiment 1. Then, oleic acid was adhered to the fine particles in the same manner as in Embodiment 1, except that the amount of sodium oleate added and the pH after addition were changed variously as in Table 1.

Then, washing, filtration and drying were carried out, whereafter black fine particles were taken out.

The saturation magnetizations, BET specific surface areas, FeO contents, and colors after mixing with resin, of these black fine particles were investigated. The results are shown in Table 1.

TABLE 1

Relationship between the amount of sodium oleate added and the pH

| | Before treatment | | | | After treatment | | | | Contents of treatment | |
|---|---|---|---|---|---|---|---|---|---|---|
| Embodiment | SM (emu/g) | SSA (m²/g) | FeO (%) | Color | SM (emu/g) | SSA (m²/g) | FeO (%) | Color | Amount added*¹ (%) | pH |
| 1 | 83 | 43 | 17 | Reddish | 84 | 25 | 32 | Black | 1.0 | 5.5 |
| 2 | 83 | 43 | 17 | Reddish | 83 | 38 | 31 | Black | 0.2 | 5.0 |
| 3 | 83 | 43 | 17 | Reddish | 83 | 38 | 32 | Biack | 0.2 | 5.5 |
| 4 | 83 | 43 | 17 | Reddish | 82 | 39 | 31 | Black | 0.2 | 6.0 |
| 5 | 83 | 43 | 17 | Reddish | 81 | 40 | 29 | Brownish black | 0.2 | 6.5 |
| 6 | 83 | 43 | 17 | Reddish | 83 | 27 | 33 | Black | 0.5 | 5.5 |
| 7 | 83 | 43 | 17 | Reddish | 82 | 20 | 33 | Black | 1.5 | 5.5 |
| 8 | 83 | 43 | 17 | Reddish | 82 | 15 | 33 | Black | 2.0 | 5.5 |

SM = Saturation magnetization
SSA = Specific surface area
*¹Amount of sodium oleate added (% by weight)

EMBODIMENT 9

To 2 kg of a commercially available magnetite reagent with a particle size of 0.2 μm and a BET specific surface area of 8 m²/g, 2 kg of water was added. The mixture was crushed in a beads mill, and the resulting slurry was vacuum dried to obtain a powder. The powder had a particle size of 0.06 μm and a BET specific surface area of 20 m²/g. X-ray diffraction showed the same results as with magnetite, although magnetite and maghemite cannot be distinguished on X-ray diffraction. The color of the powder was considerably reddish at this time point. Analysis showed the FeO content to be 8%.

50 Grams of this powder were suspended in 0.5 liter of distilled water, and 0.5 liter of a slurry containing 0.175M ferrous hydroxide was added. To this system, a solution of 2M sodium hydroxide in 0.1 liter of water was further added.

The mixture was heated to 100° C., and held for 2 hours. After the mixture was cooled to 60° C., 1%, based on magnetite, of sodium oleate was added. Then, 1N sulfuric acid was gradually added to adjust the pH to 5.5 and adhere oleic acid to the powder. After washing, filtration and drying, the black powder was taken out.

X-ray diffraction confirmed the black powder to be magnetite.

The saturation magnetization of the magnetite powder was 83 emu/g, and its BET specific surface area was 13 m²/g. Analysis showed the FeO content to be 33%.

This powder was mixed with rein in the same manner as in Embodiment 1, and the mixture was examined for color. The resin mixture was as black as the powder.

Control 1

The ultrafine magnetite particles with a BET specific surface area of 43 m²/g used in Embodiment 1 were subjected to the following treatment.

50 Grams of these particles were suspended in 0.5 liter of distilled water, and 0.5 liter of a slurry containing 0.10M ferrous hydroxide was added. To this system, a solution of 2M sodium hydroxide in 0.1 liter of water was further added.

The mixture was heated to 100° C., and held for 2 hours. After the mixture was cooled to 60° C., 1% based on magnetite, of sodium oleate was added. Then, 1N sulfuric acid was gradually added to adjust the pH to 5.5 and adhere oleic acid to the particles. After washing, filtration and drying, the resulting black powder was taken out.

X-ray diffraction confirmed the black powder to be magnetite.

The saturation magnetization of the magnetite powder was 83 emu/g, and its BET specific surface area was 25 m²/g. Analysis showed the FeO content to be 28%.

This powder was mixed with resin in the same manner as in Embodiment 1, and the mixture was examined for color. Reddishness did not disappear.

Control 2

The ultrafine magnetite particles with a BET specific surface area of 43 m²/g used in Embodiment 1 were subjected to the following treatment.

50 Grams of these particles were suspended in 0.5 liter of distilled water, and 0.5 liter of a slurry containing 0.112M ferrous hydroxide was added. To this system, a solution of 0.5M sodium hydroxide in 0.1 liter of water was further added.

The mixture was heated to 100° C., and held for 2 hours. After the mixture was cooled to 60° C., 1%, based on magnetite, of sodium oleate was added. Then, 1N sulfuric acid was gradually added to adjust the pH to 5.5 and adhere oleic acid to the particles. After washing, filtration and drying, the resulting black powder was taken out.

X-ray diffraction confirmed the black powder to be magnetite.

The saturation magnetization of the magnetite powder was 82 emu/g, and its BET specific surface area was 27 m²/g. Analysis showed the FeO content to be 27%.

This powder was mixed with rein in the same manner as in Embodiment 1, and the mixture was examined for color. Reddishness did not disappear.

Control 3

The ultrafine magnetite particles with a BET specific surface area of 43 m² g used in Embodiment 1 were subjected to the following treatment.

50 Grams of these particles were suspended in 0.5 liter of distilled water, and 0.5 liter of a slurry containing 0.112M ferrous hydroxide was added. To this system, a solution of 2M sodium hydroxide in 0.1 liter of water was further added. The mixture was heated to 100° C., and held for 2 hours. After the mixture was cooled to 80° C., it was washed, filtered and dried, whereafter the resulting black powder was taken out.

X-ray diffraction confirmed the black powder to be magnetite.

The saturation magnetization of the magnetite powder was 81 emu/g, and its BET specific surface area was 38 m²/g. Analysis showed the FeO content to be 25%.

This powder was mixed with resin in the same manner as in Embodiment 1, and the mixture was examined for color. Reddishness did not disappear.

Industrial Applicability

As described above, the present invention can give black ultrafine magnetite particles unproducible by earlier technologies, i.e., black ultrafine magnetite particles which do not become reddish when withdrawn into the air, which have a particle size of 0.1 μm or less, and which can retain the blackness of a black pigment even when mixed with resin for use in a black magnetic toner.

What is claimed is:

1. Black ultrafine magnetite particles having an FeO content of more than 31 but not more than 35% and a particle size of 0.1 μm or less.

2. A process for producing black ultrafine magnetite particles of claim 1, comprising dispersing ultrafine magnetite particles with a particle size of 0.1 μm or less in water containing ferrous hydroxide, aging the dispersion at 90 to 100° C. at a free alkali concentration of 1 mol/liter (M/l) or more, then adding 0.2 to 5%, based on the magnetite particles, of sodium oleate or potassium oleate, and adjusting the pH to 5 to 6 to adhere oleic acid to magnetite.

* * * * *